(12) United States Patent
Dee et al.

(10) Patent No.: US 10,786,048 B2
(45) Date of Patent: Sep. 29, 2020

(54) CORD LOCK

(71) Applicant: Duraflex Hong Kong Limited, Hong Kong (CN)

(72) Inventors: Kevin Wellhausen Dee, Bozeman, MT (US); Yick Fai Chan, Hong Kong (CN); Ying Kwan Wong, Hong Kong (CN)

(73) Assignee: Duraflex Hong Kong Limited, Hong Kong (CN)

( * ) Notice: Subject to any disclaimer, the term of this patent is extended or adjusted under 35 U.S.C. 154(b) by 0 days.

(21) Appl. No.: 16/554,756

(22) Filed: Aug. 29, 2019

(65) Prior Publication Data
US 2019/0380452 A1    Dec. 19, 2019

Related U.S. Application Data

(62) Division of application No. 16/003,243, filed on Jun. 8, 2018, now Pat. No. 10,441,035.

(51) Int. Cl.
| | |
|---|---|
| *A44B 11/12* | (2006.01) |
| *A44B 11/10* | (2006.01) |
| *A44B 11/16* | (2006.01) |
| *F16G 11/10* | (2006.01) |

(52) U.S. Cl.
CPC .............. *A44B 11/12* (2013.01); *A44B 11/10* (2013.01); *A44B 11/16* (2013.01); *F16G 11/106* (2013.01); *Y10T 24/3956* (2015.01)

(58) Field of Classification Search
CPC ...... F16G 11/106; F16G 11/101; Y10T 24/39; Y10T 24/394; Y10T 24/3984; Y10T 24/3969; Y10T 24/3944; Y10T 24/3716; Y10T 24/3703; Y10T 24/3956; A44B 11/16
See application file for complete search history.

(56) References Cited

U.S. PATENT DOCUMENTS

| | | | | |
|---|---|---|---|---|
| 407,592 | A * | 7/1889 | Harkness | ................ E06B 9/324 |
| | | | | 24/134 KB |
| 4,465,011 | A * | 8/1984 | Merry | ..................... B63B 21/08 |
| | | | | 114/199 |
| 4,716,630 | A * | 1/1988 | Skyba | .................. F16G 11/106 |
| | | | | 24/134 KB |
| 4,912,817 | A * | 4/1990 | Sandreid | ............... F16G 11/101 |
| | | | | 24/132 R |
| 5,263,232 | A | 11/1993 | Matoba | |

(Continued)

*Primary Examiner* — Robert Sandy
*Assistant Examiner* — Michael S Lee
(74) *Attorney, Agent, or Firm* — Collard & Roe, P.C.

(57) ABSTRACT

A cord lock has a housing with an interior cavity and an opening extending between the front and the back for receiving a cord, and an actuator having two legs that are configured to slide within the interior cavity of the housing. A spring is disposed between the housing and the actuator to bias the actuator in a raised position relative to the housing. There is a cam disposed in the interior cavity of the housing. The bottom of the cam is rotatably connected to the housing and the top is rotatably connected to the legs of the actuator. In a resting position, the spring presses the top of the cam against the housing such that when a cord is extended through the opening, the cam locks the cord in place between the cam and the housing. Depressing the actuator compresses the spring and rotates the cam.

5 Claims, 7 Drawing Sheets

(56) References Cited

U.S. PATENT DOCUMENTS

| | | |
|---|---|---|
| 5,548,873 A | 8/1996 | Macias |
| 6,038,746 A | 3/2000 | Anscher et al. |
| 2010/0043186 A1 | 2/2010 | Lesley |
| 2012/0180267 A1 | 7/2012 | Lebeau |
| 2019/0376580 A1* | 12/2019 | Oldiges ................ F16G 11/106 |

* cited by examiner

CORD LOCK

CROSS-REFERENCE TO RELATED APPLICATIONS

This is a divisional of U.S. patent application Ser. No. 16/003,243, filed on Jun. 8, 2018, the disclosure of which is herein incorporated by reference.

BACKGROUND OF THE INVENTION

1. Field of the Invention

The present invention relates to a cord lock for securing a cord in a set position. In particular, the invention relates to a cord lock utilizing a cam mechanism that locks the cord in position by rotation of the cam.

2. The Prior Art

Cord locks are commonly used to secure a cord in a certain position, such as on draw-string bags. The standard cord locks usually use a spring mechanism that presses an element against the cord to prevent it from sliding. The cord lock has a mechanism for compressing the spring to allow the cord to slide to a desired position. While these devices work well in situations where only a low amount of force is exerted on the cord, they cannot be used to secure a cord where higher amounts of force are exerted, because the spring mechanism is not strong enough to keep the cord in place if the force exceeds a certain amount.

SUMMARY OF THE INVENTION

It is therefore an object of the invention to provide a cord lock that secures the cord in position even when subjected to a high amount of force.

This object is accomplished by a cord lock having a housing having two side walls, a top surface, a bottom surface, a front, a back, an interior cavity and an opening extending between the front and the back for receiving a cord, and an actuator having a top surface, a bottom surface and two legs extending from the bottom surface, the legs being configured to slide within the interior cavity of the housing. A spring is disposed between the top surface of the housing and the bottom surface of the actuator to bias the actuator in a raised position relative to the housing. There is a cam disposed in the interior cavity of the housing. The cam has a front surface, a back surface, a top and a bottom. The bottom of the cam is rotatably connected to the housing and the top of the cam is rotatably connected to the legs of the actuator. In a resting position, the upward force of the uncompressed spring presses the top of the cam against the housing such that when a cord is extended through the opening, the cam locks the cord in place between the cam and the housing. Depressing the actuator compresses the spring and rotates the cam. This opens up enough space in the housing to allow the cord to slide freely to a new position. Releasing the actuator allows the spring to return to its uncompressed position, which forces the cam back into the locking state on the cord.

To increase the grip of the cam on the cord, the top of the cam is equipped with teeth that can dig into the cord in the locked position. Lateral pressure on the cord causes the teeth to grip more deeply into the cord, so pulling on the cord will not release it from the cam, particularly in a direction where the cam is then pressed more firmly against the top of the cavity in the housing.

In order to keep the spring in place, the top of the housing has a protrusion that extends into an interior of the spring. This prevents the spring from sliding laterally within the housing during use.

To connect the cam to the housing and actuator, the cam has side walls with protrusions that extend into corresponding apertures in the side walls of the housing and in the legs of the actuator. The cam is mounted so that the bottom of the cam is offset from the top of the cam, so that the cam is arranged oblique to a vertical axis of the cord lock. In particular, the bottom of the cam is arranged offset from the vertical axis along which the spring is compressed. This way, downward pressure on the actuator causes the bottom of the cam to rotate about the protrusions extending into the side walls of the housing, and causes the top of the cam to move in an arc downward into the cavity, guided by the cooperating protrusions and apertures in the legs of the actuator. The protrusions in the legs are elongated to accommodate the arc along which the top of the cam travels. This rotational motion of the cam opens up a passage in the housing to allow the cord to slide freely therethrough. Releasing the actuator moves the cam back into the starting locked position, preventing any further movement of the cord. This rotational motion of the cam also means that pulling on the cord causes the cam to rotate to an even more locked position against the top of the housing, so that the harder the cord is pulled, the more tightly it is locked in place.

In one embodiment, the actuator has two side walls extending from its bottom surface. The side walls are located on an outside edge of the actuator such that a slot is formed on each side of the actuator between a corresponding one of the legs and each of the side walls. The side walls of the housing fit within these slots when the actuator is inserted into the housing. This arrangement stabilizes the actuator and prevents any lateral movement as it slides up and down the housing.

In an alternative embodiment of the invention, the cord lock can be configured as a double cord lock—with two sets of each of the elements described above, to lock two cords in the housing simultaneously. In this embodiment, the housing has a second interior cavity and there is a second one of the actuators configured to slide within the second interior cavity. A second spring is mounted between the second actuator and the housing, and a second one of the cams is rotatably connected to the legs of the second actuator and to the side walls of the housing.

Preferably, the two actuators are mounted on opposite ends of the housing and are positioned so that the springs are compressed by pressing the actuators toward each other. This way, the two cords can be released in a single action, using only one hand.

In this embodiment, the cams are mounted so that the bottom of the cams are arranged adjacent one another near the center of the cord lock and offset from a longitudinal center on the same side, and the tops of the cams are located remote from one another, such that the cams grip the cords tighter when the cords are pulled in the same direction.

In another embodiment of the invention, a different actuating and spring mechanism is used to actuate the cam. In this embodiment, the cord lock has a housing having two side walls, a top surface, a bottom surface, a front, a back, an interior cavity and an opening extending between the front and the back for receiving a cord, and a cam disposed in the interior cavity. The cam has a channel therethrough, an actuating hook and a gripping portion. A post extends through the channel in the cam and is rotatably connected to the side walls of the housing by extending through apertures in the housing. A spring is connected to the post for biasing the cam in a locked position, such that a cord extending through the opening is pressed against the housing by the gripping portion of the cam. An actuator is provided for actuating the cam. The actuator has a cross-bar configured for arrangement in the actuating hook, and a handle arranged opposite the cross-bar, such that pressing the lever moves the cam out of the locked position to release the cord from the housing.

To support the actuator on the housing, the housing has protrusions extending from the side walls, and the side walls of the actuator rest on the protrusions when the cross bar is arranged in the actuating hook. These protrusions form a pivot point for the handle when it is pressed to release the cam.

Preferably, the spring is a torsion spring extends around the post. In this embodiment, the channel has a slot that is configured for accommodating an end of the torsion spring. The other end of the torsion spring is biased against the housing, so that the tension between the two ends of the spring keeps the cam in the locked position unless the lever is moved, which then overcomes the spring force of the spring to release the cam.

In order to increase the locking of the cord, the gripping portion of the cam contains a plurality of teeth, which dig into the cord when the cam is in the locked position.

The present invention provides a novel way of locking the cord, by using a cam element that can withstand greater lateral forces because lateral forces only cause the cam to rotate and lock the cord in even tighter to the cord lock.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 14 shows a front view of the cord lock of FIG. 12; a

DETAILED DESCRIPTION OF THE PREFERRED EMBODIMENT

Figure 1:
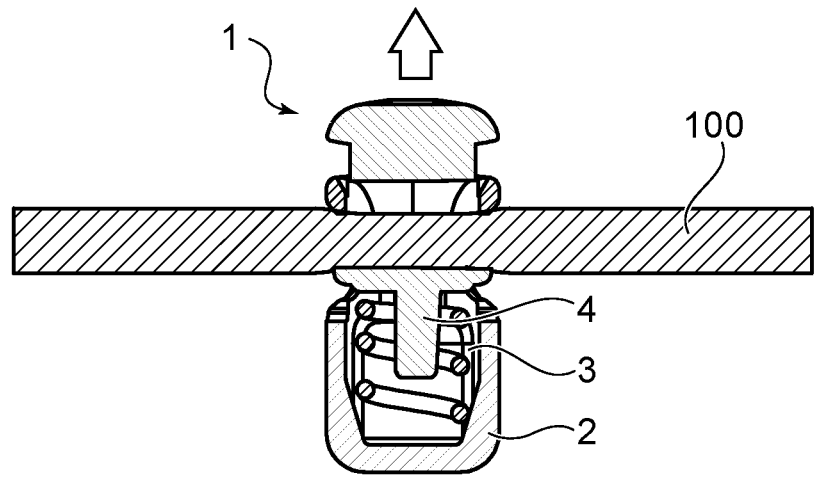
FIG. 1 shows a cross sectional view of a traditional cord locking device according to the prior art.
Figure 2:
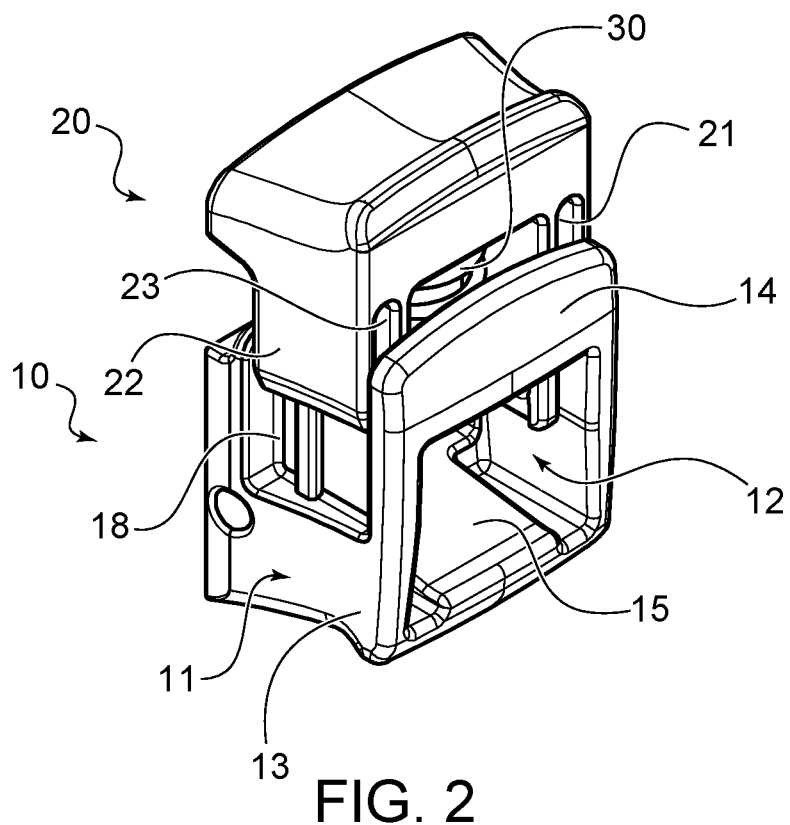
FIG. 2 shows one embodiment of the cord lock according to the invention with the cam removed.
Figure 3:
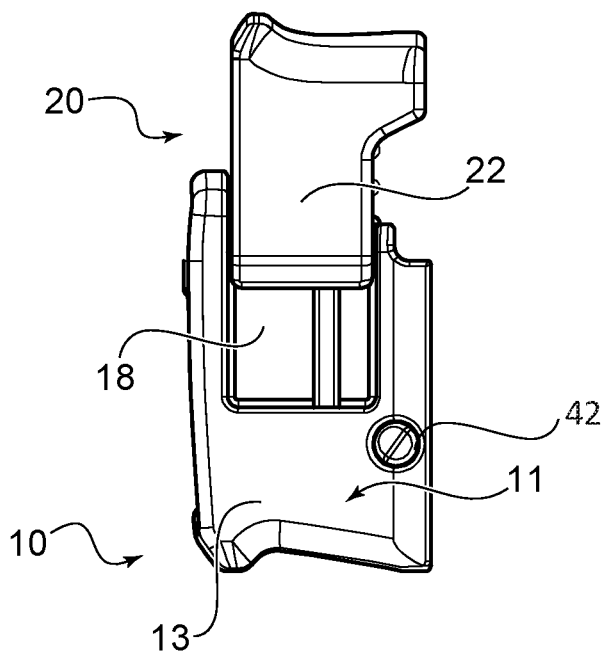
FIG. 3 shows a side view of the cord lock.
Figure 4:
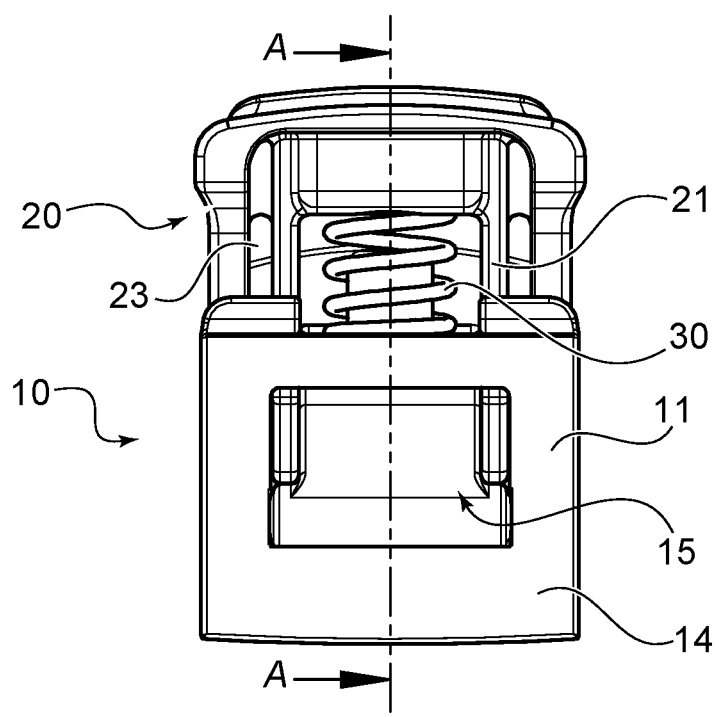
FIG. 4 shows a front view of the cord lock.

Referring now in detail to the drawings and, in particular, FIG. 1 shows a prior art cord lock 1, which has a housing 2 and an actuator 3 that is held in a biased position by a spring 4. A cord 100 extends through a hole in the housing, and the biased force of actuator 3 keeps cord 100 in position. The problem with this arrangement is that it is relatively easy to overcome the force of the spring, as lateral force on the cord runs perpendicular to the spring force.

One embodiment of the cord lock according to the invention is shown in FIGS. 2-7. Here, cord lock 10 comprises a housing 11 having an interior cavity 12, side walls 13 and a front 14 with an opening 15. An actuator 20 is positioned on the top of housing 11, and has legs 21 that slide within side walls 13 of housing 11. Side walls 22 of actuator 20 slide up and down in an indentation 18 in the outside of side walls 13, so that side walls 13 of housing 11 fit within a groove 23 of actuator 20, to keep actuator 20 in position on housing 11. A spring 30 is mounted on a post 16 of housing 11, and rests against the underside of actuator 20. In a resting position, spring 30 biases actuator 20 in a raised position. Spring 30 is a compression spring that can be compressed by pressing downward on actuator 20.

Figure 5:
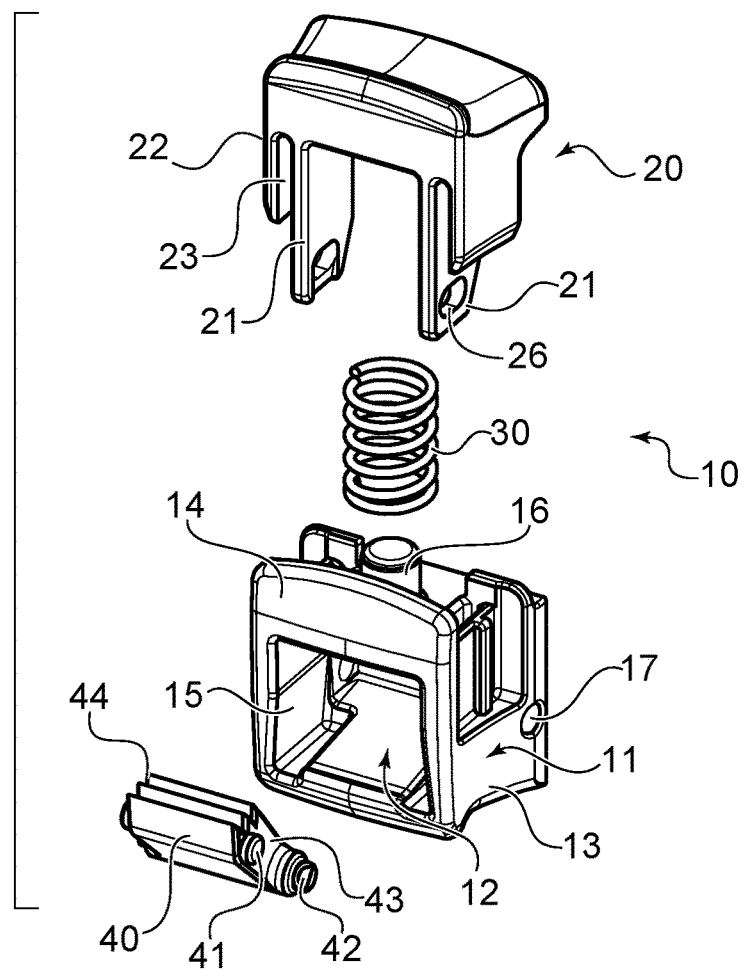
FIG. 5 shows an exploded view of the cord lock.
Figure 6:
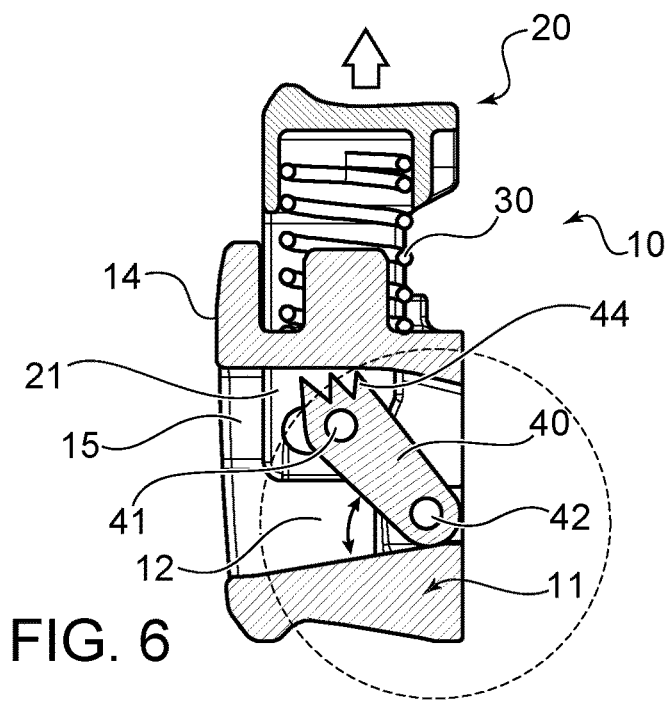
FIG. 6 shows a cross-sectional view along lines A-A of FIG. 4.
Figure 7:
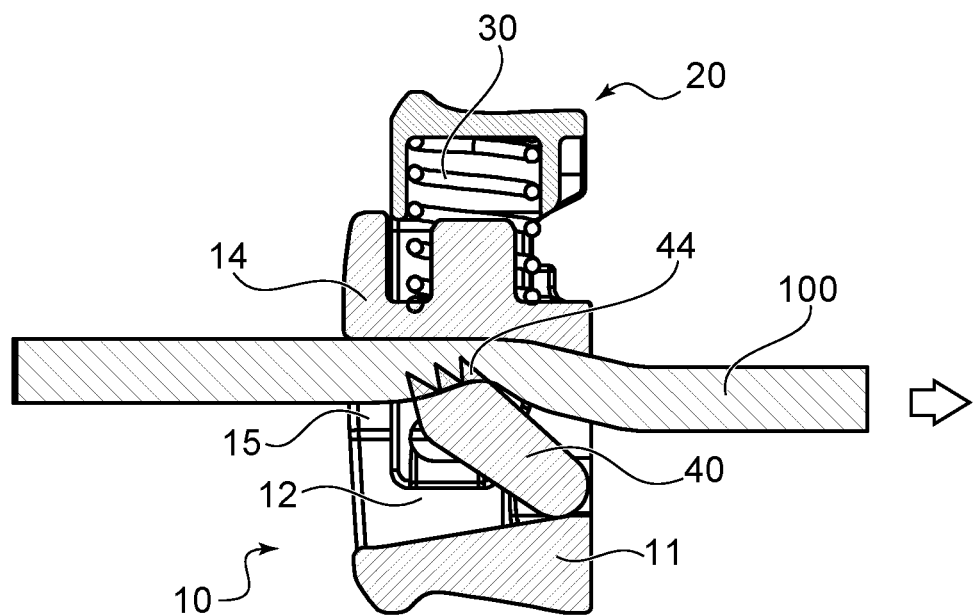
FIG. 7 shows the cross-sectional view of FIG. 6 with a cord inserted therein.

A cam 40 is connected to both the housing 11 and actuator 20. As shown in FIG. 5, cam 40 has protrusions 41, 42 on each of its side walls 43. Protrusions 42 extend through apertures 17 in housing 11, and protrusions 41 extend through apertures 26 in actuator 20, to rotatably connect cam 40 to housing 11 and actuator 20. When the cord lock 10 is fully assembled, cam 40 is arranged so that the bottom is offset from the top, leading to an oblique arrangement of cam 40 in housing 11, as can be seen in FIGS. 6 and 7. In a resting position as shown in FIG. 6, the pressure of spring 30 keeps actuator 20, and consequently cam 40, in a fully raised position, where cam 40 is essentially completely blocking opening 15. The offset orientation of cam 40 means that the lateral motion of actuator 20 up and down causes cam 40 to rotate about the pivot points created by projections 41 and 42. This arrangement, as shown in FIG. 7, allows a cord 100 to be locked in place in cord lock 10. The upward pressure on cam 40 keeps cord 100 firmly in place. Teeth 44 dig into cord 100 and keep it from slipping. Any lateral force to the right as shown by the arrow only causes cam 40 to rotate toward a more vertical position and secure cord 100 even more firmly in place. To release cord 100, the user must press down on actuator 20, which then causes cam 40 to rotate counter-clockwise to achieve a more horizontal position, and open up space in opening 15 for cord 100 to slide free.

Figure 8:
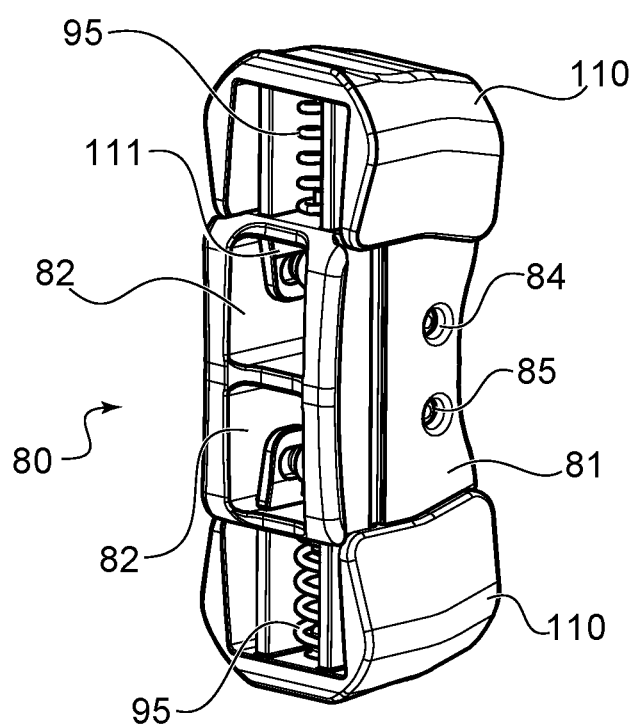
FIG. 8 shows a perspective view of a second embodiment of the cord lock according to the invention.
Figure 9:
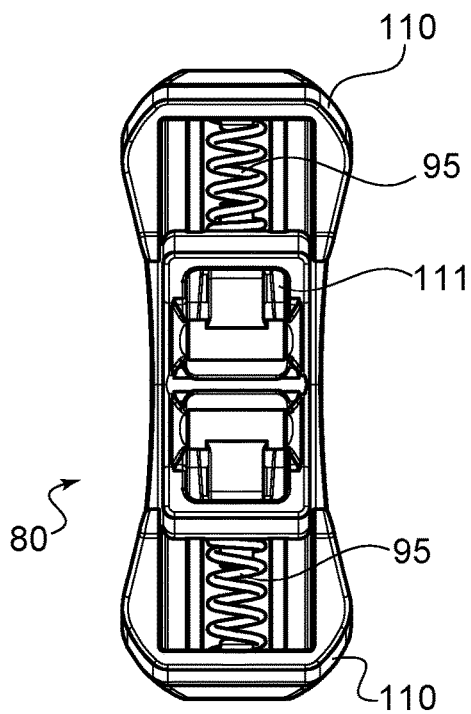
FIG. 9 shows a front view of the cord lock of FIG. 8.
Figure 10:
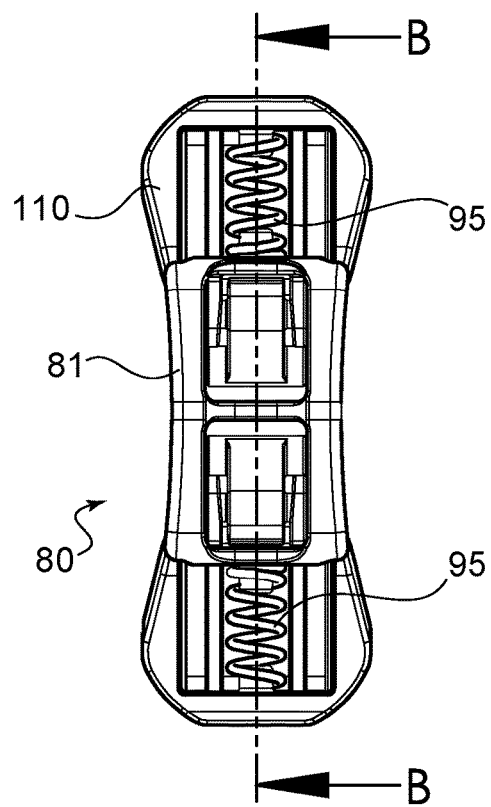
FIG. 10 shows a rear view of the cord lock of FIG. 8.
Figure 11:
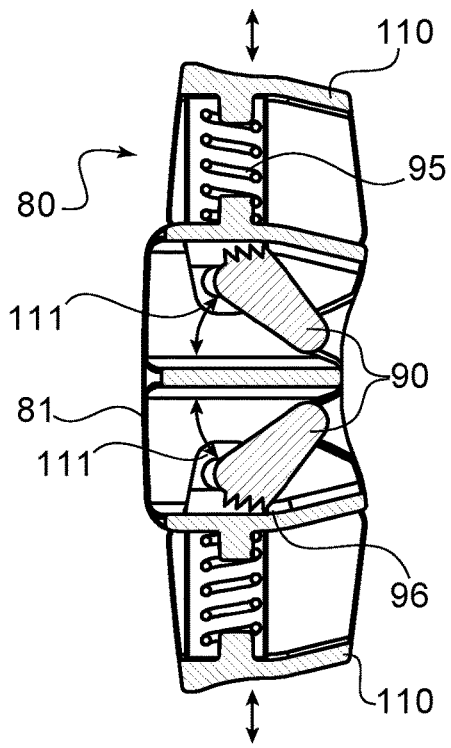
FIG. 11 shows a cross-sectional view along lines B-B of FIG. 10.
Figure 12:
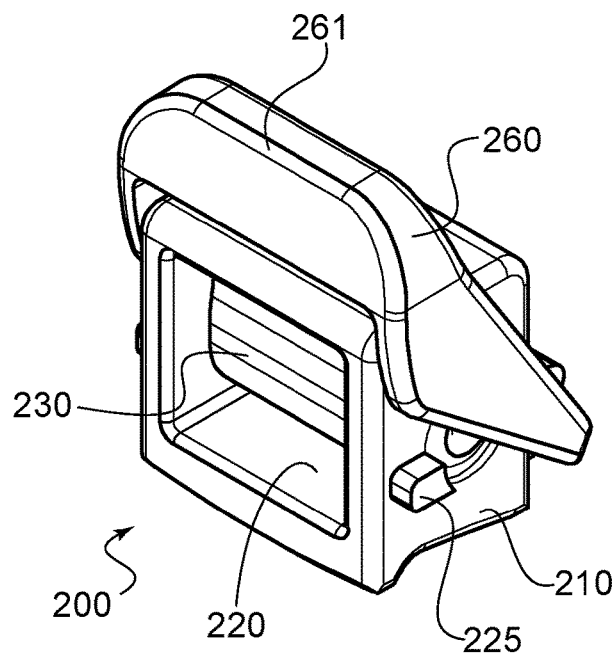
FIG. 12 shows a third embodiment of the cord lock according to the invention.
Figure 13:
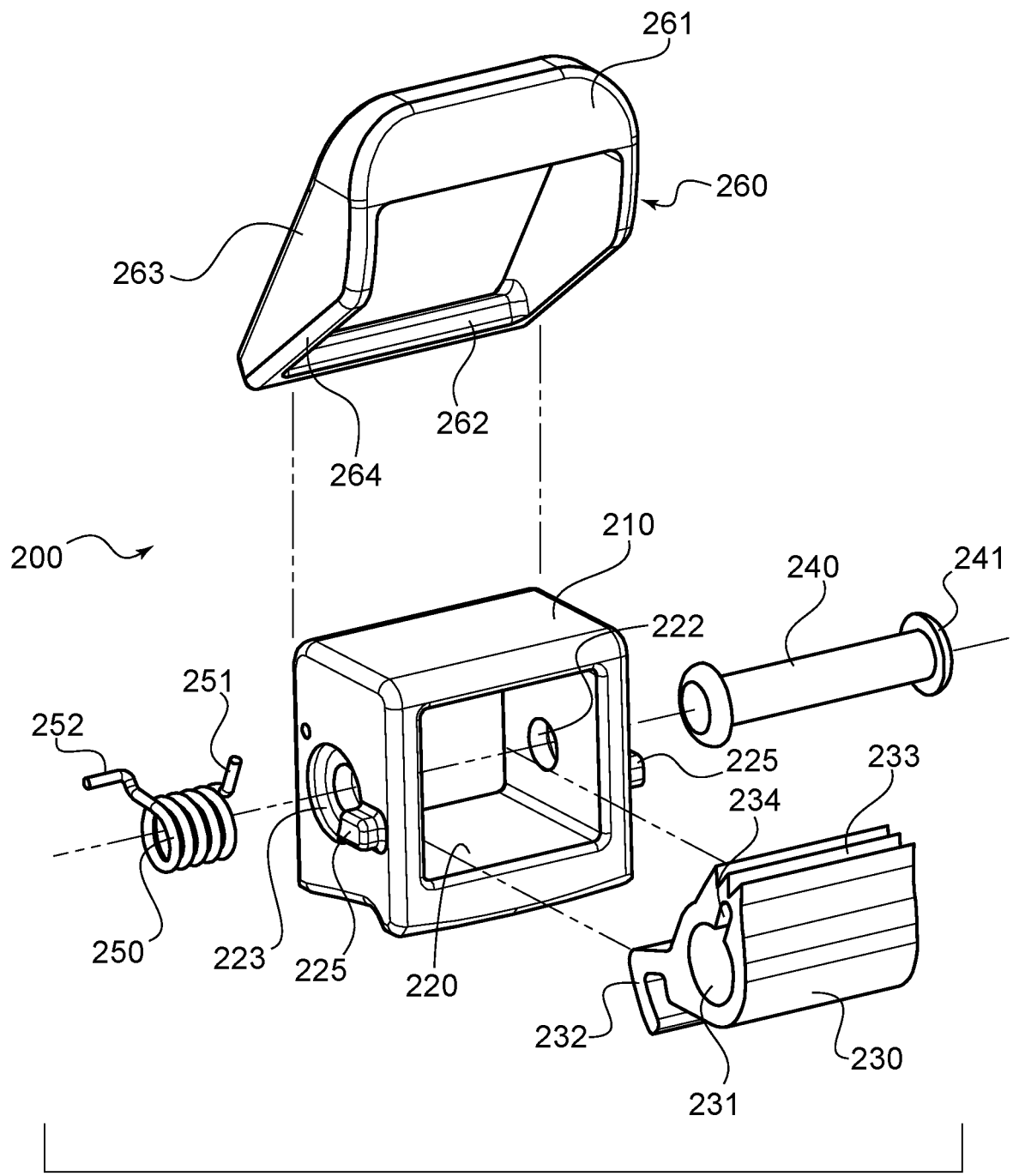
FIG. 13 shows an exploded view of the components of the cord lock of FIG. 12.
Figure 14:
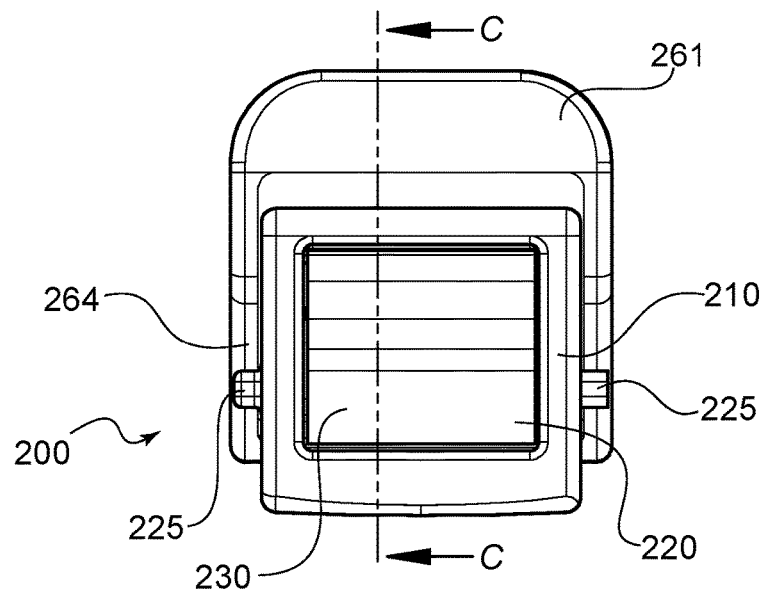

An alternative embodiment of the cord lock is shown in FIGS. 8-11. Here, cord lock 80 is essentially two of cord locks 10 from FIGS. 2-7 that are put together into a single unit. As shown in FIG. 8, cord lock 80 comprises a housing 81 with two interior cavities 82 that house cams 90, which are rotatably connected to housing 81 and actuators 110 in the same manner as described with respect to FIGS. 2-7. Apertures 84, 85 in housing 81 accommodate corresponding protrusions in cam 90 to rotatably hold cam 90 in place. Actuators 110 each have legs 111 that extend into housing 81 to connect with the top portion of cams 90. Compression springs 95 keep cams 90 in a biased position, to hold two cords simultaneously in position in cord lock 80. Cams 90 are positioned so that the tops of cams 90 face away from each other, and they rotate in opposite directions upon pressing of actuators 110, as shown in FIG. 11. This allows actuators 110 to be pressed simultaneously by squeezing them together, which can be done by a single hand. As with the first embodiment, cams 90 can be equipped with teeth 96 for better gripping of the cords.

Figure 15:
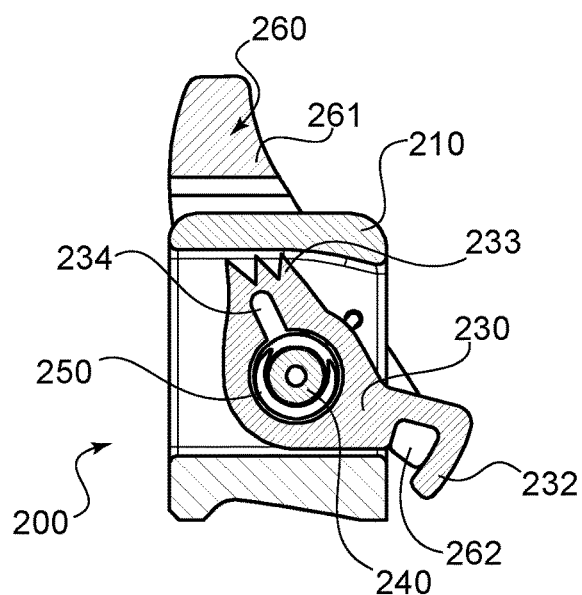
FIG. 15 shows a cross-sectional view along lines C-C of FIG. 14.

Another embodiment of the invention is shown in FIGS. 12-16. Here, cord lock 200 is formed from a housing 210 having an interior cavity 220 in which a cam 230 is rotatably mounted on a post 240. Post 240 extends through channel 231 in cam 230, and through apertures 222, 223 in housing 210 to mount cam 230 to housing 210. Channel 231 has a cutout 234 for accommodating the end 251 of torsion spring 250, which extends around post 240 and keeps cam 230 in a biased position in cavity 220 of housing 210. This biased position is shown in FIG. 15, where teeth 233 of cam 230 are shown abutting the top of housing 210. A cord (not shown) can be extended between teeth 233 and the top of housing 210 maintained there under pressure by spring 230. Attempts to pull a cord to the right only cause cam 230 to rotate into an even further locked position and prevent all movement of a cord.

Figure 16:
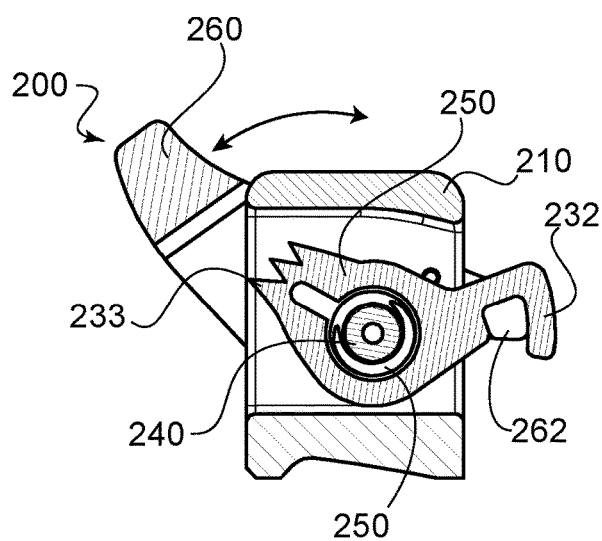
FIG. 16 shows the view of FIG. 15 in a released position.

To enable adjustment of the cord, an actuator 260 is connected to cam 230, by placing bar 262 of actuator 260 underneath hook 232 of cam 230. Then, edges 264 of actuator 260 rest on protrusions 225 of housing 210. Protrusions 225 act as pivot points for actuator 260, so that pressing down on handle 261 of actuator 260, causes actuator 260 to rotate around protrusions 225, raising bar 262, and thereby causing cam 230 to rotate to an open position, as shown in FIG. 16. This allows a cord to be adjusted or removed, before releasing actuator 260 and cam 230 back into the resting biased position shown in FIG. 15.

Accordingly, while only a few embodiments of the present invention have been shown and described, it is obvious that many changes and modifications may be made thereunto without departing from the spirit and scope of the invention.

What is claimed is:

1. A cord lock comprising:
    a housing having two side walls with protrusions extending from exterior surfaces of the side walls, a top surface, a bottom surface, a front, a back, an interior cavity and an opening extending between the front and the back for receiving a cord,
    a cam disposed in the interior cavity, the cam having a channel therethrough, an actuating hook and a gripping portion;
    a post extending through the channel in the cam and being rotatably connected to the side walls of the housing;
    a spring connected to the post and being configured for biasing the cam in a locked position, such that a cord extending through the opening is pressed against the housing by the gripping portion of the cam;
    an actuator having a cross-bar configured for arrangement in the actuating hook, and a handle arranged opposite the cross-bar, wherein the protrusions form pivot points for the actuator, such that pressing the handle causes the actuator to rotate around the protrusions, and move the cam out of the locked position to release the cord from the housing.

2. The cord lock according to claim 1, wherein the spring is a torsion spring that extends around the post.

3. The cord lock according to claim 2, wherein the channel has a slot that is configured for accommodating an end of the torsion spring.

4. The cord lock according to claim 1, wherein the gripping portion contains a plurality of teeth.

5. The cord lock according to claim 1, wherein the post extends through apertures in the side walls of the housing.

* * * * *